(12) United States Patent
Murota

(10) Patent No.: US 8,605,130 B2
(45) Date of Patent: Dec. 10, 2013

(54) IMAGE FORMING APPARATUS AND IMAGE FORMING METHOD

(75) Inventor: Koichi Murota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/355,140

(22) Filed: Jan. 20, 2012

(65) Prior Publication Data

US 2012/0194630 A1 Aug. 2, 2012

(30) Foreign Application Priority Data

Jan. 27, 2011 (JP) ................................. 2011-014709

(51) Int. Cl.
*B41J 2/47* (2006.01)
*B41J 2/435* (2006.01)

(52) U.S. Cl.
USPC .......................................... 347/235; 347/250

(58) Field of Classification Search
None
See application file for complete search history.

(56) References Cited

U.S. PATENT DOCUMENTS

2003/0030718 A1* 2/2003 Maeda ........................... 347/250
2006/0023231 A1* 2/2006 Ohmiya .......................... 358/1.7

FOREIGN PATENT DOCUMENTS

JP 3587484 B2 10/1997

OTHER PUBLICATIONS

The English Language Abstract with Publication No. JP 09-274156 corresponds to Foreign Patent Document JP-3587484-B2.

* cited by examiner

*Primary Examiner* — Matthew Luu
*Assistant Examiner* — Kendrick Liu
(74) *Attorney, Agent, or Firm* — Harness, Dickey & Pierce

(57) ABSTRACT

An image forming apparatus includes: a plurality of optical systems, each of which includes a light-beam generating unit that generates a light beam, a rotary polygon mirror that deflects the light beam so as to scan a image carrier, and a light-beam detecting unit that detects the light beam deflected for scanning at a predetermined position on a scanning path by rotationally driving the rotary polygon mirror; a time-difference measuring unit that measures a time difference between light-beam detecting signals; a generation-timing determining unit that determines time of generation timing for generating a start signal that designates a start of an image writing operation so that the generation timing does not overlap another timing when each of the light-beam detecting signals is output from the corresponding time-difference measuring unit; and a start-signal generating unit that generates the start signal based on the time for the generation timing.

9 Claims, 5 Drawing Sheets

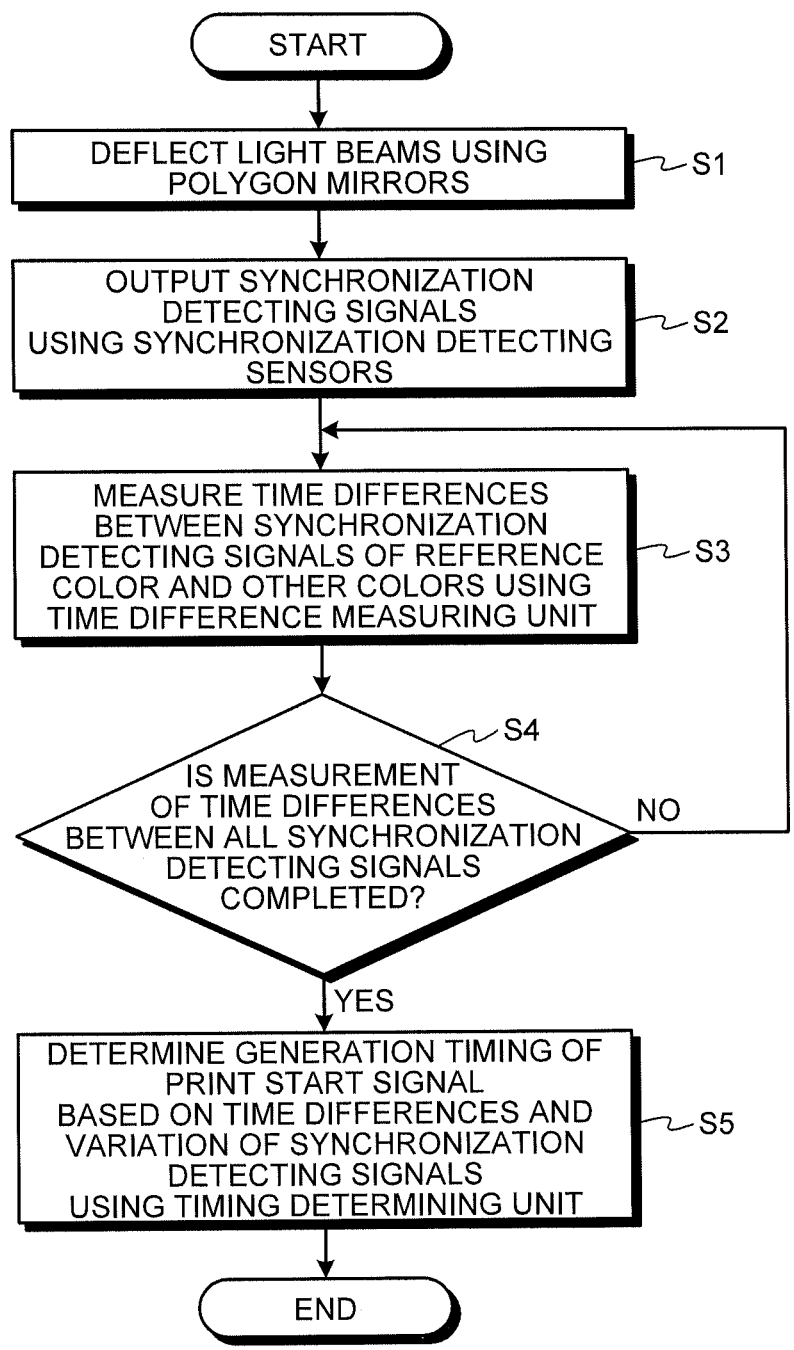

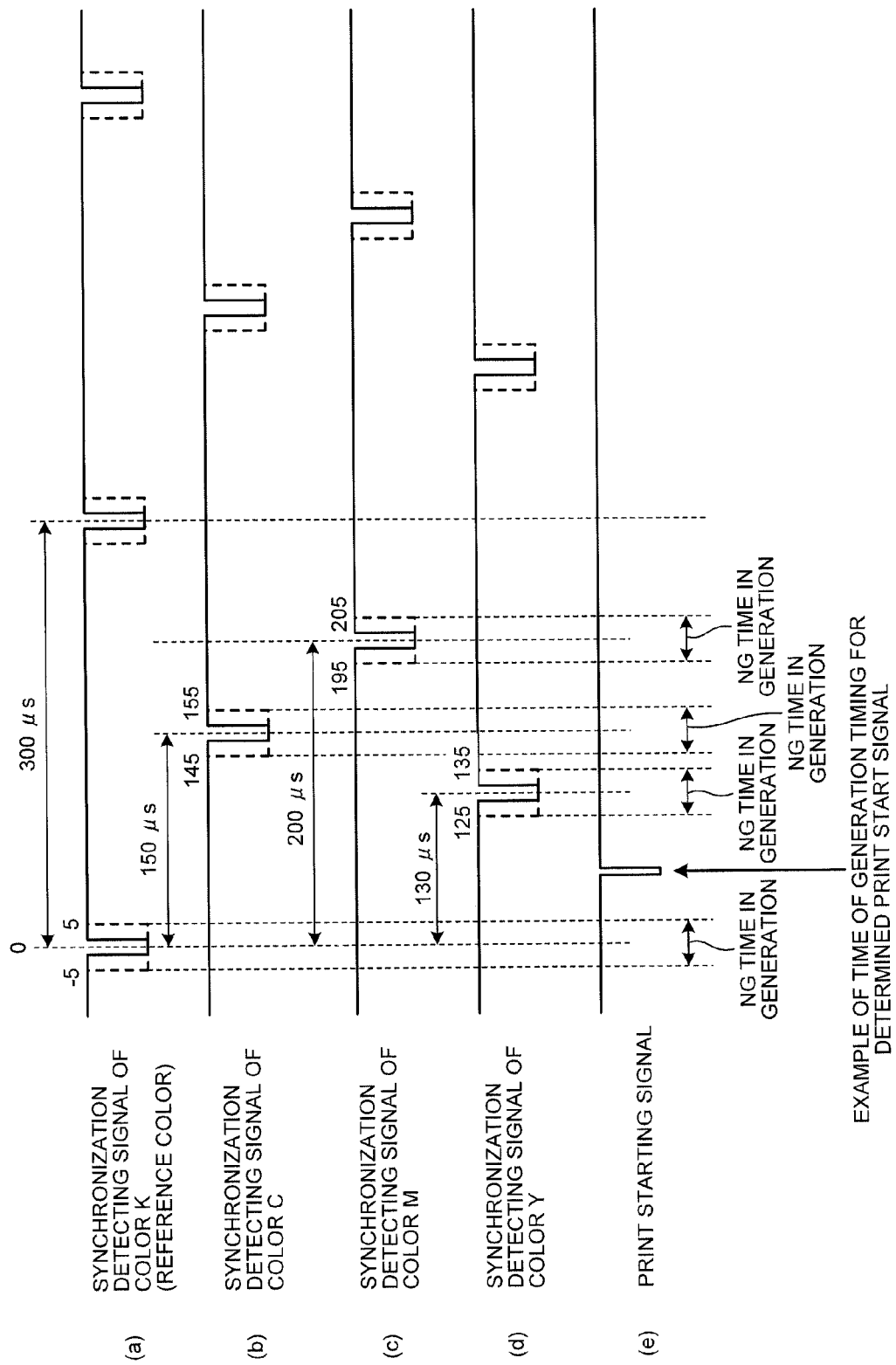

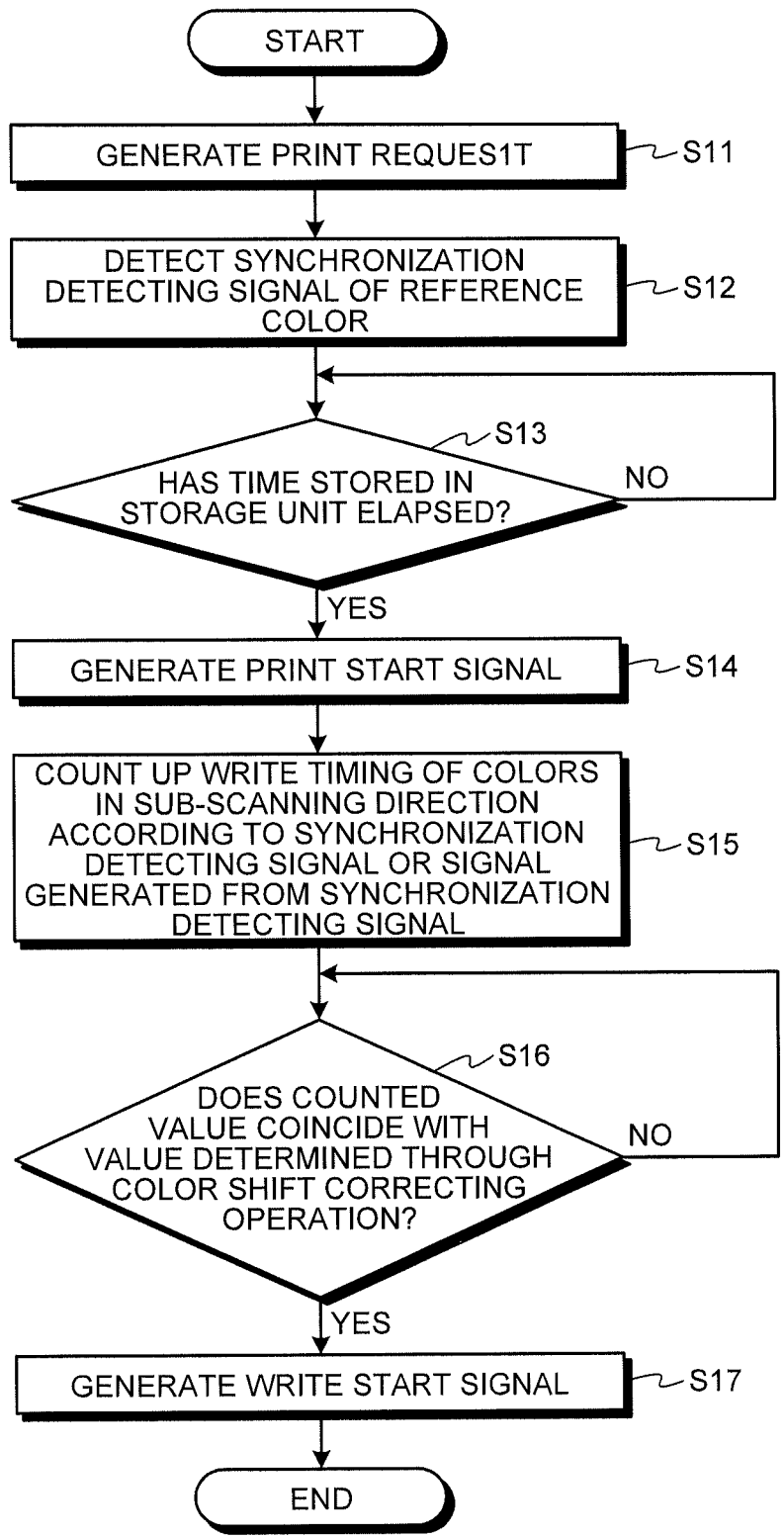

IMAGE FORMING APPARATUS AND IMAGE FORMING METHOD

CROSS-REFERENCE TO RELATED APPLICATION

The present application claims priority to and incorporates by reference the entire contents of Japanese Patent Application No. 2011-014709 filed in Japan on Jan. 27, 2011.

BACKGROUND OF THE INVENTION

1. Field of the Invention

The present invention relates to an image forming apparatus that includes a facsimile, a printer, a copying machine, or a multifunction peripheral (MFP).

2. Description of the Related Art

Conventionally, in an image forming apparatus that includes a facsimile, a printer, a copying machine, or an MFP, Japanese Patent Application Laid-open No. 9-274156 discloses the technology in which the phases of rotation reference clocks of a plurality of polygon motors are changed so as not to make a registration shift corresponding to a period of time of performing one scanning in a sub-scanning direction, and a synchronization detecting signal is generated so as not to overlap the timing for turning ON a sub-scanning synchronization signal (a print start signal), thereby preventing the occurrence of an image deviation by almost one scanning pitch in the sub-scanning direction.

However, there has been a problem in that hardware for changing a phase of a reference clock so that timing for turning ON a sub-scanning synchronization signal does not enter a range of time difference of the synchronization detecting signal (a variation range is included) becomes complex in the image forming apparatus according to the related art described above.

In view of the above problem, there is a need that a print start signal can be issued while a synchronization detecting signal for detecting a plurality of colors is not issued.

SUMMARY OF THE INVENTION

It is an object of the present invention to at least partially solve the problems in the conventional technology.

An image forming apparatus includes: a plurality of optical systems, each of which includes a light-beam generating unit that generates a light beam, a rotary polygon mirror that deflects the light beam generated by the light-beam generating unit so as to scan a image carrier with the light beam, and a light-beam detecting unit that detects the light beam that is deflected for scanning at a predetermined position on a scanning path by rotationally driving the rotary polygon mirror; a time-difference measuring unit that measures a time difference between light-beam detecting signals detected by the respective light-beam detecting units; a generation-timing determining unit that determines time of generation timing for generating a start signal that designates a start of an image writing operation so that the generation timing does not overlap another timing when each of the light-beam detecting signals is output from the corresponding time-difference measuring unit based on a measurement result of the time-difference measuring unit; and a start-signal generating unit that generates the start signal based on the time for the generation timing that is determined by the generation-timing determining unit.

An image forming apparatus includes: a plurality of optical systems, each of which includes a light-beam generating means for generating a light beam, a light-beam deflecting means for deflecting the light beam generated by the light-beam generating means so as to scan a image carrier with the light beam, and a light-beam detecting means for detecting the light beam that is deflected for scanning at a predetermined position on a scanning path by driving the light-beam deflecting means; a time-difference measuring means for measuring a time difference between light-beam detecting signals detected by the respective light-beam detecting means; a generation-timing determining means for determining time of generation timing for generating a start signal that designates a start of an image writing operation so that the generation timing does not overlap another timing when each of the light-beam detecting signals is output from the corresponding time-difference measuring unit based on a measurement result of the time-difference measuring means; and a start-signal generating means for generating the start signal based on the time for the generation timing that is determined by the generation-timing determining means.

An image forming method includes: an image forming apparatus that includes a plurality of optical systems, each of which includes a light-beam generating unit that generates a light beam, a rotary polygon mirror that deflects the light beam generated by the light-beam generating unit so as to scan a image carrier with the light beam, and a light-beam detecting unit that detects the light beam that is deflected for scanning at a predetermined position on a scanning path by rotationally driving the rotary polygon mirror; a time-difference measuring unit that measures a time difference between light-beam detecting signals detected by the respective light-beam detecting units; a generation-timing determining unit that determines time for generation timing for generating a start signal that designates a start of an image writing operation so that the generation timing does not overlap another timing when each of the respective light-beam detecting signals is output from the corresponding time-difference measuring unit based on a measurement result of the time-difference measuring unit; and a start-signal generating unit that generates the start signal based on the time for the generation timing that is determined by the generation-timing determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart illustrating a process of generating a print start signal in the MFP illustrated in FIG. 2;

FIG. 4 is a timing chart illustrating an example of timing at which a synchronization detecting signal from each synchronization detecting sensor of time-difference measuring unit 6 of a plurality of synchronization-detecting signals illustrated in FIG. 1 is received; and FIG. 5 is a flowchart illustrating a process of a printing operation in an MFP according to the related art.

DETAILED DESCRIPTION OF THE PREFERRED EMBODIMENTS

Hereinafter, embodiments will be specifically described with reference to the drawings.

Figure 2:
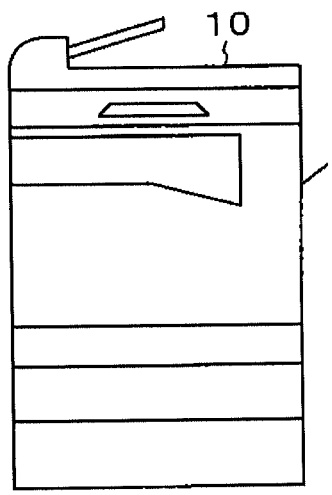
FIG. 2 is a diagram illustrating an external appearance of an MFP as an embodiment of an image forming apparatus.

FIG. 2 is a diagram illustrating the external appearance of an MFP as an embodiment of an image forming apparatus.

An MFP 10 is an image forming apparatus that includes a plurality of functions including a wireless communication function; a copying function, a printing function; a scanner function; and a facsimile communication function, and that performs a full color printing operation by forming respective color images from among four colors of black (K), cyan (C), magenta (M), and yellow (Y) with a plurality of polygon mirrors. Furthermore, the MFP 10 may be applied to an image forming apparatus such as a facsimile, a printer, or a copying machine.

Figure 1:
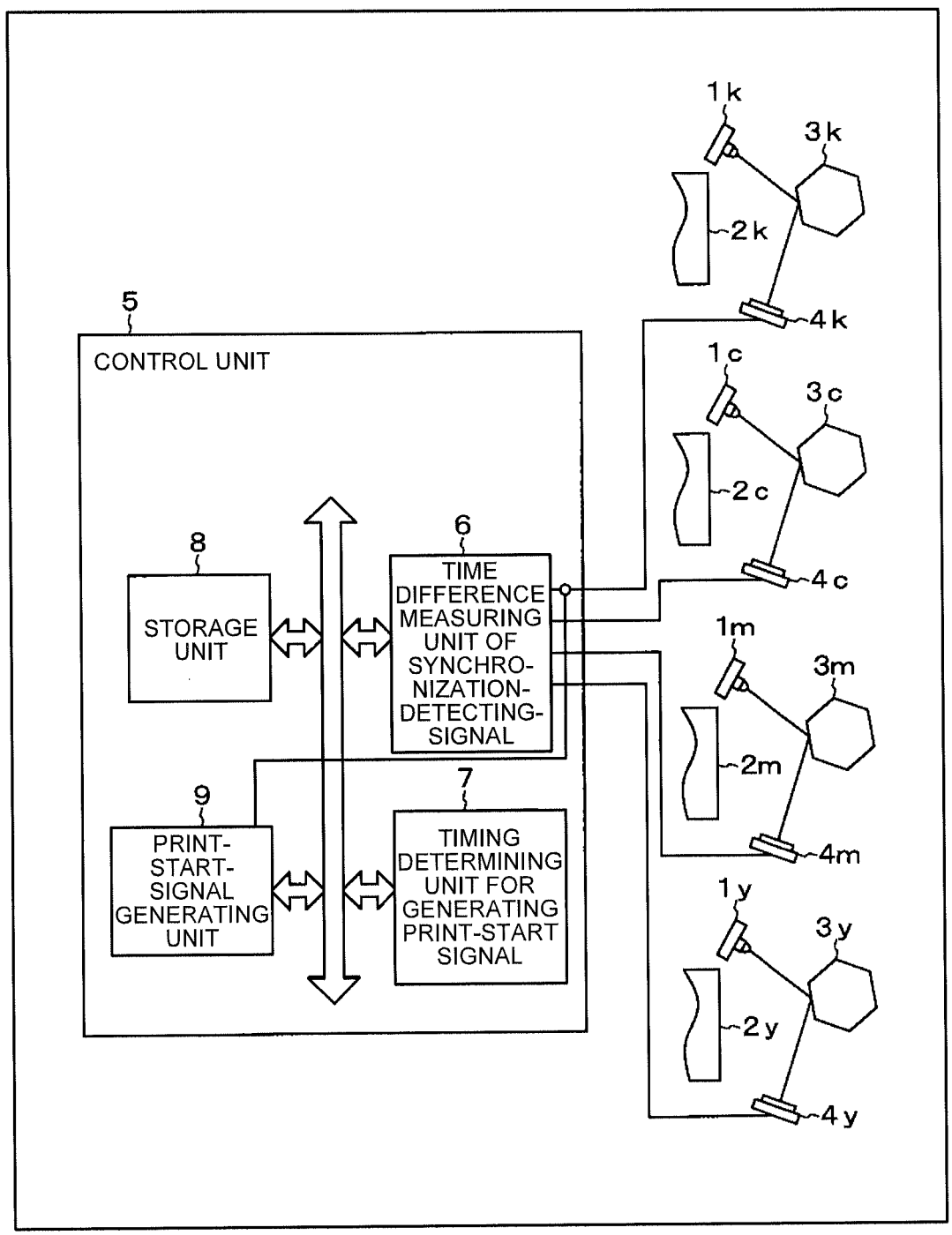
FIG. 1 is a diagram illustrating a configuration of a main portion related to an exposure process for image formation in an MFP illustrated in FIG. 2.

FIG. 1 is a diagram illustrating a configuration of a main portion related to an exposure process for image formation in the MFP 10 illustrated in FIG. 2.

Light sources 1k to 1y are light-beam generating units that cause respective light-emitting bodies such as laser diodes (LDs) to emit light beams of laser light for exposing the images of respective colors of black, cyan, magenta, and yellow so as to form a color image.

Photosensitive elements 2k to 2y serve as image carriers on which toner images of the respective colors of black, cyan, magenta, and yellow are formed. The respective toner images formed on the photosensitive elements 2k to 2y are transferred onto a sheet in a superimposed manner, so that a color image is printed on the sheet.

Because configurations related to processes ranging from forming the toner images on the photosensitive elements 2k to 2y to printing the toner images on the sheet are well known, the descriptions thereof will be omitted.

Polygon mirrors 3k to 3y are formed by rotary polygon mirrors that deflect and scan light beams generated by the light sources 1k to 1y toward the photosensitive elements 2k to 2y, respectively. The polygon mirrors 3k to 3y are driven to rotate by polygon motors (not illustrated).

Synchronization detecting sensors 4k to 4y are formed, respectively, by synchronization detecting units that detect the light beams deflected for scanning by the corresponding rotationally driven polygon mirrors 3k to 3y at predetermined positions on a scanning path and that detect scanning start positions of the respective light beams in a main scanning direction.

The MFP 10 is provided with four sets of optical systems that include exposing units, deflecting units, and synchronization detecting units for color images of black, cyan, magenta, and yellow. The number of the sets of the optical systems provided for the MFP 10 is not limited to four and any plurality of the sets and the optical systems may be allowed.

A control unit 5 is realized by a micro computer that includes a central processing unit (CPU), a read only memory (ROM), and a random access memory (RAM). The control unit 5 controls an entire operation of the MFP 10, and also realizes respective functions of a time-difference measuring unit 6 of a plurality of synchronization-detecting signals, a timing determining unit 7 for generating a print-start signal, a storage unit 8, and a signal generating unit 9 for generating a print-start signal.

The time-difference measuring unit 6 counts the synchronization detecting signal of a reference color and the synchronization detecting signals of the other colors at a sufficiently higher clock speed than a line period, thereby serving as a time difference measuring unit that measures the time difference between a preselected reference light-beam detecting signal and another light-beam detecting signal.

In the embodiment, black is set as a reference color. The time-difference measuring unit 6 measures the time difference between the received time of the synchronization detecting signal output from the synchronization detecting sensor 4k and the received time of each of other synchronization detecting signals output from the synchronization detecting sensors 4c to 4y, and transmits the time differences to the timing determining unit 7.

The timing determining unit 7 serving as a generation timing determining unit determines, on the basis of a measurement result of the time-difference measuring unit 6, the time for the generation timing of a start signal that designates starting of an image writing operation so as not to overlap the output timing of the respective light-beam detecting signals. The timing determining unit 7 determines, on the basis of the respective time differences that are received from the time-difference measuring unit 6, a first time at which generation timing of the synchronization detecting signals of the respective synchronization detecting sensors 4k to 4y and a second time that does not overlap the generation timing in a case when a change occurs in the generation of the synchronization detecting signals as the time for generation timing of the start signal for the image writing operation, and stores the time in the storage unit 8.

The storage unit 8 includes a RAM being a memory that stores the time for generation timing of the start signal of the image writing operation determined by the timing determining unit 7.

The signal generating unit 9 operates at a sufficiently higher clock speed than the line period. The signal generating unit 9 outputs, after the time period for generation timing stored in the storage unit 8 has elapsed since the synchronization detecting signal of the reference color output from the synchronization detecting sensor 4k has been received, the start signal (the print start signal) of the image writing operation to a portion related to image writing.

Next, a mechanism that causes color deviation corresponding to a period of time for one scan in the sub-scanning direction occurs will be described.

FIG. 5 is a flowchart illustrating a process of a printing operation in the MFP according to the related art.

In Step (denoted by "S" in the drawing) S11, a print request is issued. When a synchronization detecting signal of the reference color is detected in Step S12, it is determined whether or not the time stored in advance in the storage unit has elapsed in Step S13. If it is determined that the time has elapsed, the print start signal is generated in Step S14. In Step S15, the write timing of each color in the sub-scanning direction is counted up according to the corresponding synchronization detecting signal or the signal generated from the corresponding synchronization detecting signal.

Here, if the generation of the print start signal and the detection of the synchronization detecting signal are close to each other in time, the synchronization detecting signal may be earlier or later than the print start signal depending on the variation in the generation timing of the synchronization detecting signal.

For example, when a color adjusting operation is performed, in a case where the synchronization detecting signal is subsequent to the print start signal, there will be no problem if the synchronization detecting signal is subsequent to the print start signal during an actual printing process. However, in a case where the phase relation between the synchronization detecting signal and the print start signal is reversed due to a variation of the synchronization detecting signal and thus the synchronization detecting signal is ahead of the print start signal, it may take time corresponding to a time period of one scanning operation in obtaining, by the determination in Step S16, coincidence between a count value obtained by the counting-up operation and a value determined through a color shift correcting operation. For this reason, the write start operation in Step S17 may cause a color shift corresponding to a period of one scanning operation in the sub-scanning direction.

Next, the process of the MFP 10 according to the embodiment will be described.

FIG. 3 is a flowchart illustrating a process of generating the print start signal in the MFP 10 according to the embodiment.

FIG. 4 is a timing chart illustrating an example of timing for receiving a synchronization detecting signal from each of the synchronization detecting sensors 4k to 4y of the time-difference measuring unit 6 illustrated in FIG. 1.

Light beams that are turned ON by a lighting control unit (not illustrated) are deflected by the respective polygon mirrors 3k to 3y so as to be incident on the respective synchronization detecting sensors 4k to 4y.

In Step S1 of FIG. 3, the light beams start being deflected by the polygon mirrors, and then in Step S2, the respective synchronization detecting sensors output the synchronization detecting signals to the time-difference measuring unit 6.

Here, each of the synchronization detecting sensors 4k to 4y generates a synchronization detecting signal when the corresponding light beam is incident thereon. However, because the phases of the polygon motors that rotationally drive the polygon mirrors 3k to 3y are indefinite, the synchronization detecting signals are generated at irregular timing.

Therefore, as illustrated in FIG. 4, the time-difference measuring unit 6 receives the respective synchronization detecting signals at irregular timing.

In Step S3 of FIG. 3, the time-difference measuring unit 6 measures the time difference between the synchronization detecting signal of the reference color (in this case, black) and each of the synchronization detecting signals of the other colors, and then the procedure proceeds to Step S4.

In Step S4, the time-difference measuring unit 6 determines whether or not the measurement of the time differences for all the synchronization detecting signals is completed, and if the measurement has not yet been completed, the process of Step S3 is repeated. If the measurement is completed, in Step S5, the respective time differences are transmitted to the timing determining unit 7. The timing determining unit 7 determines the time for generation timing of the print start signal in consideration of the time when the synchronization detecting signals that are preset to have the respective time differences are varied in the generation thereof, and the process ends.

For example, FIG. 4 illustrates a case in which the time from the reception of the synchronization detecting signal of the reference color of black to the reception of the synchronization detecting signal of the color C is 150 µs, the time from the reception of the synchronization detecting signal of black to the reception of the synchronization detecting signal of the color M is 200 µs, the time from the reception of the synchronization detecting signal of black to the reception of the synchronization detecting signal of the color Y is 130 µs, the variation range in the variation for the generation of the respective synchronization detecting signals is ±5 µs, and the one line period is 300 µs.

In this case, when the print start signals are generated, after the reception of the synchronization detecting signal of black, in the time periods of 0 to 5 µs, 125 µs to 135 µs, 145 µs to 155 µs, 195 µs to 205 µs, and 295 µs to 300 µs, the synchronization detecting signals may cover the print start signal, thereby causing a color shift corresponding to one scanning time period to occur in the sub-scanning direction.

The timing determining unit 7 determines, as the time for the generation timing of the print start signal, a time with an elapsed time from the reception of the synchronization detecting signal of black to be different from time periods of 0 to 5 µs, 125 µs to 135 µs, 145 µs to 155 µs, 195 µs to 205 µs, and 295 µs to 300 µs.

For example, the timing determining unit 7 determines, as the time for the generation timing of the print start signal, a median of "65 µs" that is a median of the longest time in the time zone in which the print start signal may occur, and stores the determined time in the storage unit 8.

In the image writing operation of a typical printing operation, the signal generating unit 9 refers to "65 µs" that is stored in the storage unit 8 at the time of receiving the synchronization detecting signal of black, and generates the print start signal after the time has elapsed by "65 µs".

As described above, the time differences between the synchronization detecting signal that is the reference of the print start signal for counting the write timing in the sub-scanning direction and all the other synchronization detecting signals are measured, and a control is performed such that, even when the generation of each synchronization detecting signal varies, the print start signal is generated at time when the synchronization detecting signal is certainly not generated. Therefore, with a simple configuration, it is possible to delete a color shift that may occur in the sub-scanning direction due to a phase relation among a plurality of the polygon motors with an amount corresponding to a time period of one scanning operation.

With an image forming apparatus according to the embodiment, it is possible to generate a print start signal when a synchronization detecting signal for detecting a plurality of colors is not generated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a plurality of optical systems, each optical system provided for an associated one of a plurality of colors printable by the image forming apparatus,
    each of the optical systems including,
        a light-beam generating unit that generates a light beam of the associated color,
        a rotary polygon mirror that deflects the light beam of the associated color generated by the light-beam generating unit so as to scan an image carrier with the light beam, and
        a light-beam detecting unit that generates a light-beam detecting signal, if the light-beam detecting unit detects the light beam of the associated color that is deflected for scanning at a predetermined position on a scanning path by rotationally driving the rotary polygon mirror; and
    a control unit configured to control operation of all of the plurality of optical systems, the control unit including,
        a time-difference measuring unit that measures a relative time difference between one of the light-beam detecting signals detected by a respective light-beam detecting units and a rest of the light-beam detecting signals detected by associated light-beam detecting units,
        a generation-timing determining unit that determines a generation-timing for generating a start signal that designates a start of an image writing operation so that the generation timing does not overlap another timing when each of the light-beam detecting signals is output from the corresponding time-difference measuring unit based on a measurement result of the time-difference measuring unit, and
a start-signal generating unit that generates the start signal based on the time for the generation timing that is determined by the generation-timing determining unit.

2. The image forming apparatus according to claim 1, wherein the time-difference measuring unit includes a unit that measures a time difference between a light-beam detecting signal, that is a preselected reference among the light-beam detecting signals detected by the respective light-beam detecting units, and another light-beam detecting signal.

3. The image forming apparatus according to claim 1, wherein the generation-timing determining unit includes a unit that, when determining time of generation timing of a start signal that designates a start of an image writing operation, causes the time not to overlap a time period during which output timing of each of the light-beam detecting signals varies.

4. The image forming apparatus according to claim 1, further comprising:
a storage unit that stores the time for the generation timing determined by the generation-timing determining unit,
wherein the start-signal generating unit includes a unit that generates the start signal based on a time calculation result of the generation timing stored in the storage unit in an image writing operation in a normal printing mode.

5. The image forming apparatus according to claim 1, wherein the start-signal generating unit is configured to generate the start signal such that, within a line period, the start signal occurs before the light-beam detecting units generate the rest of the light-beam detecting signals.

6. An image forming apparatus comprising:
a plurality of optical systems, each optical system provided for an associated one of a plurality of colors printable by the image forming apparatus,
each of the optical systems including,
a light-beam generating means for generating a light beam of the associated color,
a light-beam deflecting means for deflecting the light beam of the associated color generated by the light-beam generating means so as to scan an image carrier with the light beam, and
a light-beam detecting means for generating a light-beam detecting signal, if the light-beam detecting means detects the light beam of the associated color that is deflected for scanning at a predetermined position on a scanning path by driving the light-beam deflecting means; and
a control means for controlling operation of all of the plurality of optical systems, the control means including,
a time-difference measuring means for measuring a relative time difference between one of the light-beam detecting signals detected by a respective light-beam detecting means and a rest of the light-beam detecting signals detected by associated light-beam detecting means,
a generation-timing determining means for determining a generation timing for generating a start signal that designates a start of an image writing operation so that the generation timing does not overlap another timing when each of the light-beam detecting signals is output from the corresponding time-difference measuring unit based on a measurement result of the time-difference measuring means, and
a start-signal generating means for generating the start signal based on the time for the generation timing that is determined by the generation-timing determining means.

7. The image forming apparatus according to claim 6, wherein the start-signal generating means is configured to generate the start signal such that, within a line period, the start signal occurs before the light-beam detecting means generate the rest of the light-beam detecting signals.

8. An image forming method in an image forming apparatus that includes a plurality of optical systems, each optical system provided for an associated one of a plurality of colors printable by the image forming apparatus,
each of the optical systems including,
a light-beam generating unit that generates a light beam of the associated color,
a rotary polygon mirror that deflects the light beam of the associated color generated by the light-beam generating unit so as to scan an image carrier with the light beam, and
a light-beam detecting unit that generates a light-beam detecting signal, if the light-beam detecting unit detects the light beam of the associated color that is deflected for scanning at a predetermined position on a scanning path by rotationally driving the rotary polygon mirror,
the image forming method comprising;
measuring relative time differences between one of the light-beam detecting signals detected by a respective light-beam detecting unit and a rest of the light-beam detecting signals detected by associated light-beam detecting units;
determining a generation timing for generating a start signal that designates a start of an image writing operation so that the generation timing does not overlap another timing when each of the respective light-beam detecting signals is output from the corresponding time-difference measuring unit based on a measurement result of the time-difference measuring unit; and
generating the start signal based on the time for the generation timing that is determined by the generation-timing determining unit.

9. The image forming method according to claim 8, wherein the generating the start signal generates the start signal such that, within a line period, the start signal occurs before the light-beam detecting units generate the rest of the light-beam detecting signals.

* * * * *